(12) United States Patent
Deolalikar et al.

(10) Patent No.: US 7,730,797 B1
(45) Date of Patent: Jun. 8, 2010

(54) AUTHENTICATING A PACKAGE USING NOISE LEVEL

(75) Inventors: Vinay Deolalikar, Mountain View, CA (US); Salil Pradhan, San Jose, CA (US); Alipio Caban, Arecibo, PR (US); Lester Ortiz, Camuy, PR (US); Geoff Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 11/264,065

(22) Filed: Nov. 1, 2005

(51) Int. Cl.
*G01M 19/00* (2006.01)
(52) U.S. Cl. ........................ 73/865.8; 283/74
(58) Field of Classification Search ............... 73/865.8; 283/74, 81
See application file for complete search history.

(56) References Cited

U.S. PATENT DOCUMENTS

| | | | |
|---|---|---|---|
| 6,806,478 B1* | 10/2004 | Hatfield | 250/492.1 |
| 2004/0023397 A1* | 2/2004 | Vig et al. | 436/1 |
| 2004/0112962 A1* | 6/2004 | Farrall et al. | 235/462.01 |
| 2004/0188528 A1* | 9/2004 | Alasia et al. | 235/468 |
| 2004/0205343 A1* | 10/2004 | Forth et al. | 713/168 |
| 2005/0108044 A1* | 5/2005 | Koster | 705/2 |
| 2005/0269819 A1* | 12/2005 | Chambers | 283/74 |
| 2006/0053025 A1* | 3/2006 | Mertens | 705/1 |
| 2007/0291988 A1* | 12/2007 | Karimov et al. | 382/103 |

* cited by examiner

*Primary Examiner*—Hezron Williams
*Assistant Examiner*—Nashmiya S Fayyaz

(57) ABSTRACT

In a method of authenticating a package, an origin noise level of the package is determined based upon one or more identifying characteristics, where the origin noise level is a deviation from a normal condition caused by the one or more identifying characteristics. In addition, the package is authenticated based upon the origin noise level of the package.

17 Claims, 6 Drawing Sheets

AUTHENTICATING A PACKAGE USING NOISE LEVEL

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Counterfeit products may enter the supply chain to the customer at any number of different points in the supply chain. For example, a wholesaler may receive counterfeit goods which it passes on to a retailer, or directly to the customer.

Because of the possibility of spoofing, where the packaging of the product is counterfeited, manufacturers often attempt to prevent entry of counterfeit products into the marketplace by protecting the packages. Some approaches that manufacturers have used to make it difficult for counterfeiters include the use of holograms or three dimensional printing on packages. For example, a hologram of a company's logo is placed on a package so a customer buying the product knows that the product is from the company and is not counterfeit. These approaches provide some deterrence; however, counterfeiting has become very sophisticated so that it is has become more difficult for manufacturers to provide product packaging that cannot be replicated by counterfeiters of the product.

SUMMARY

A method of authenticating a package is disclosed herein. In the method, an origin noise level of the package is determined based upon one or more identifying characteristics, where the origin noise level is a deviation from a normal condition caused by the one or more identifying characteristics. In addition, the package is authenticated based upon the origin noise level of the package.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, various embodiments of the present invention are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A system and method for authenticating a package are described herein. More particularly, the package may be authenticated through a determination of whether the package contains an indication that it differs from a normal condition. The normal condition of the package is a condition of the package prior to the deviation. The difference is a deviation from the normal condition, and may be used to generate a "noise" level, as described in greater detail herein below. By way of example, the normal condition of the package may comprise a first color ink and the deviation from the normal condition may comprise a second color ink, to generate the "noise". In addition, the deviation used to generate the "noise" may intentionally be introduced on the package during, for instance, manufacture of the package.

The deviation may be detected to determine the noise level of the package. The detected noise level may be compared with a predetermined or origin noise level to determine whether the package is authentic. For instance, if the detected noise level is substantially similar to the origin noise level, the package may be considered as being authentic. In one regard, by introducing a deviation in a characteristic of the package as disclosed herein, counterfeiting or other fraudulent copying of the package may substantially be reduced.

Figure 1A:
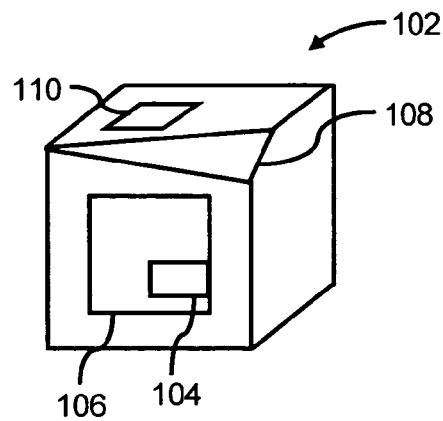
FIG. 1A illustrates a simplified example of a package that may be authenticated, according to an embodiment of the invention.

FIG. 1A illustrates a simplified example of a package 102 which may be authenticated according to various examples described herein. Although the package 102 is shown to have a relatively cubic shape, the package 102 may comprise any reasonably suitable shape. The package 102 may comprise, for instance, a container, a carton or a pallet, where, for instance, a carton includes 20-30 containers and a pallet includes about 500 or more cartons. A container may include a box or a bottle or any other type of receptacle or container for goods.

The package 102 may include one or more identifying characteristics that are intentionally introduced onto the package 102 and are useable to substantially distinguish the package 102 from counterfeited or other copied products. Generally speaking, the one or more identifying characteristics may comprise characteristics that differ from a normal package condition. In other words, the package 102 may appear identical to the normal package except for the one or more identifying characteristics. The differences caused by the one or more identifying characteristics may be detected and converted into a difference or "noise" level. The "noise" level may be defined as the amount of deviation from the normal condition, which for example, is a difference between a normal package, such as a package in the normal condition, and a package 102 containing the one or more identifying characteristics.

Generally speaking, the one or more identifying characteristics may be selected to create a noise level that is sufficient to be detected by a computerized system. In addition, or alternatively, the one or more identifying characteristics may be selected such that they are nearly invisible to the naked eye, but may be detected by a computerized system through use of a reading device, such as a scanner, camera, etc. As described in greater detail herein below, the noise level may be employed to determine whether a package is authentic.

The one or more identifying characteristics may include indicia 104 placed on, for instance, a label 106 or other part of the package 102. The indicia 104 may include, for example, the introduction of one or more numbers, a watermark, a pattern, an image, varied colors, color coding, resolution, pixels, shadows, forms, a varied grayscale, line thickness, spacing of characters, character curvature, character length, microtext, etc. In this regard, for instance, the normal condition may comprise a first printed pattern and a deviation on the package 102 may comprise a second printed pattern that differs from the first printed pattern.

In addition, or alternatively, the one or more identifying characteristics may include a structural feature 108 of the package 102 that differs from the normal condition of the package 102. By way of example, the structural feature 108 may include a change in the structural configuration of the package 102. As shown in FIG. 1A, the structural feature 108 may include a cutout or notched portion in the package 102. It should be appreciated that the structural feature 108 may comprise any reasonably suitable structural deviation from a normal condition, without departing from a scope of the package 102 described herein. For instance, the structural feature 108 may include, making the package 102 comprise a different size or other structural difference.

The package 102 may also include a package identifier 110. The package identifier 110 may include any type of unique identifier, such as a serial number. The package identifier 110 may be affixed to the package 102 through use of any reasonably suitable affixing method. For example, the package identifier 110 may be affixed to the package 102 using a printing process, a label, an RFID tag, an embedded microprocessor, etc.

For example, the package identifier 110 may include an RFID tag that uses radio frequency technology to transmit information, such as a unique serial number, stored in the RFID tag. For example, the RFID tag may include an integrated circuit and an antenna. The RFID tag may be read by an RFID reader (not shown) configured to generate a magnetic field for interrogating the RFID tag using an antenna, which may include an inductive element. The magnetic field induces an energizing signal for powering the RFID tag via the antenna. When powered the RFID tag generates a signal which may include information associated with the package 102, such as the package identifier 110. The signal is modulated using a known modulation scheme and transmitted to the RFID reader. Instead of an RFID tag, the package identifier may be stored in another medium or provided in a different form, such as a bar code, variable color text, color lines, fingerprint patterns, color tiles, microtext, and other printed patterns with encoded information and other types of printed mediums.

Figure 1B:
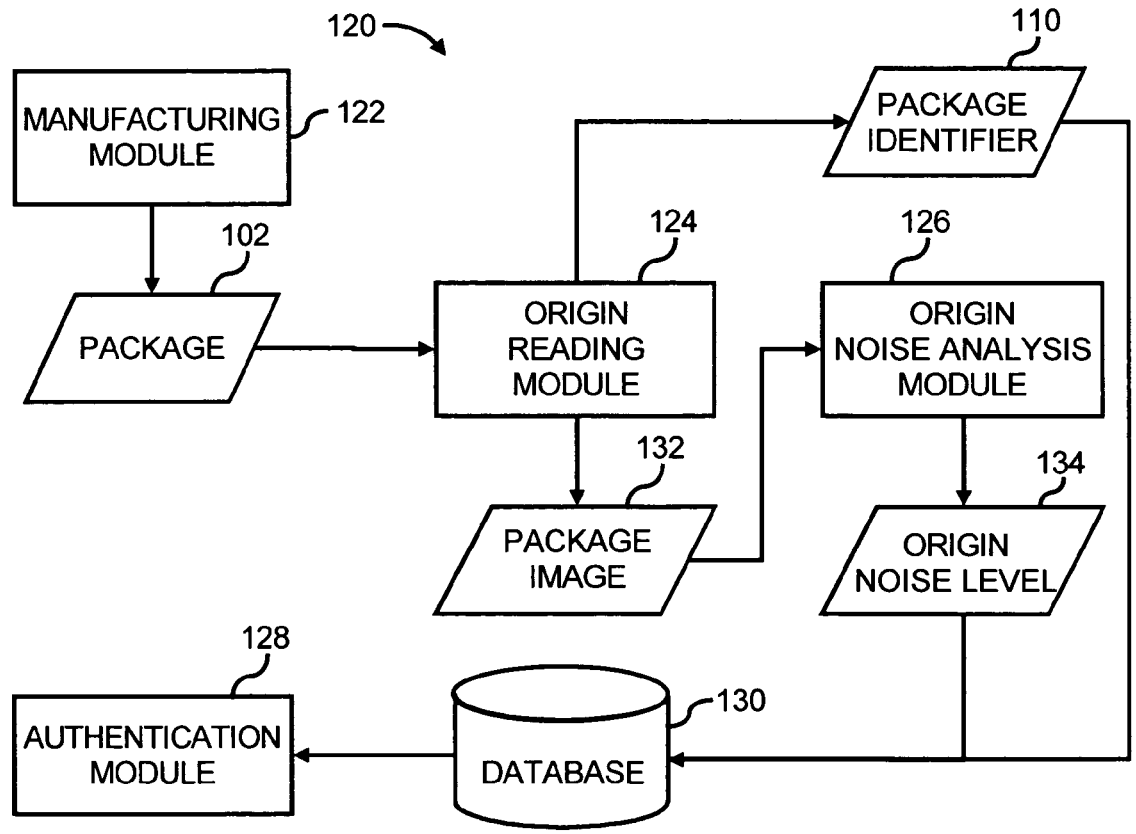
FIG. 1B illustrates a simplified example of data flow in a system for providing a package that may be authenticated, according to an embodiment of the invention.

FIG. 1B illustrates a simplified example of data flow in a system 120 for providing a package that may be authenticated. It should be understood that the following description of the product providing system 120 is but one manner of a variety of different manners in which such a system 120 may be operated. In addition, it should be understood that the product providing system 120 may include additional components and that some of the components described may be removed and/or modified without departing from a scope of the product providing system 120.

The product providing system 120 is depicted as including a manufacturing module 122, an origin reading module 124, an origin noise analysis module 126 and an authentication module 128. The package 102 may be manufactured at the manufacturing module 122 to include one or more identifying characteristics. As stated above, the one or more identifying characteristics may be introduced, for instance, through printing onto the package 102, either directly or indirectly, or through the introduction of a structural feature 108 in the package 102. By way of example, the package 102 may be printed using custom printing or made through custom manufacturing methods.

For instance, packaging material for a plurality of boxes may be created as one sheet, where the one or more identifying characteristics of the packaging material for each box is different from the one or more identifying characteristics of the packaging material for the remaining boxes. The differences in the one or more identifying characteristics may be used to create variations in noise levels caused by the one or more identifying characteristics. Alternatively, the one or more identifying characteristics introduced onto each box may be substantially identical, such that the noise levels of each package 102 of a particular manufacturer, for example, are the same.

An RFID tag or other means of storing a package identifier 110 may optionally be affixed onto the package 102. The package identifier 110 may be affixed to the package 102 prior to, during, or after a process of introducing the one or more identifying characteristics on the package 102 at the manufacturing module 122. Placement of the package identifier 110 onto the package 102 is considered optional because the package 102 may be identified in certain instances through detection of the one or more identifying characteristics. In any regard, the other means of storing a package identifier 110 may include, for instance, bar codes, other types of printed media, tags other than radio frequency, and any storage medium that may be affixed to or included in the package 102.

The package 102 may be read at the origin reading module 124, which may include a suitable reading device (not shown), such as a scanner, a camera, etc. More particularly, the reading device of the origin reading module 124 may be employed to image or otherwise scan the package 102, to obtain a package image 132. The origin reading module 124 may optionally include a suitable reading device, such as a RFID reader, a barcode scanner, etc., configured to read the package identifier 110 from the package 102.

The package image 132 may be forwarded to the origin noise analysis module 126. The origin noise analysis module 126 generally operates to analyze the package image 132 to determine the level of noise 134 caused by one or more identifying characteristics. More particularly, for instance, the origin noise analysis module 126 may compare the signal caused by a normal package that has not been manufactured to include the one or more identifying characteristics with the signal caused by the package image 132. The origin noise analysis module 126 may determine the noise level of the package 102 based upon the differences in the signals between the normal package and the package 102, which is considered the origin noise level 134. As such, the origin noise level analysis module 126 may include a noise level analyzer, such as known in the art, for detecting deviations. One example of noise level analyzer may include software operable to detect differences between two images, if for example, the deviations were determined by comparing an image of a normal package and an image of a package including one or more identifying characteristics.

The origin noise level 134 of the package 102 may be stored in a database 130 associated with the authentication module 128, which is described in greater detail herein below. In addition, the origin noise level 134 of the package 102 may be stored in association with the package identifier 110 of the package 102 in the database 130. The database 130 may comprise a database of a server system, such as the database 130 of the server system 220 shown in FIG. 2. In one example, the database 130 may be associated with a software application for accumulating and providing information regarding packages, such as the package 102.

Figure 1C:
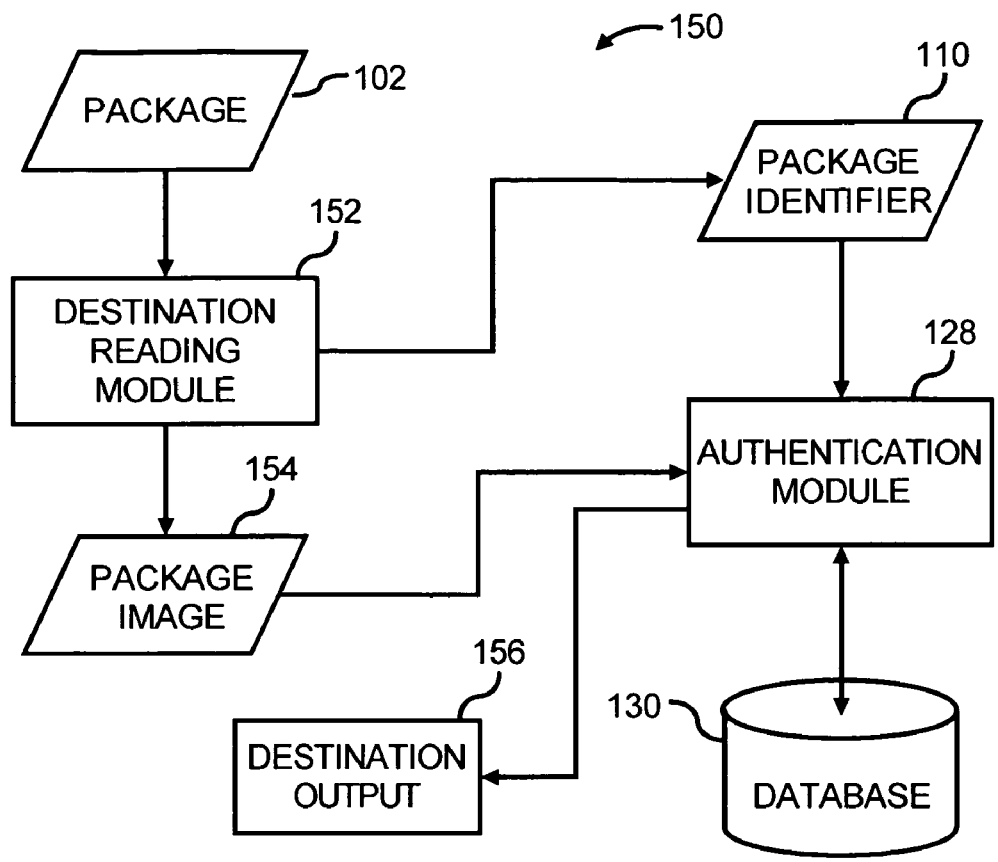
FIG. 1C illustrates a simplified example of data flow in a system for determining the authenticity of packages, according to an embodiment of the invention.

With reference now to FIG. 1C, there is shown a simplified example of data flow in a system 150 for determining the authenticity of packages. It should be understood that the following description of the authenticity determining system 150 is but one manner of a variety of different manners in which such a system 150 may be operated. In addition, it should be understood that the authenticity determining system 150 may include additional components and that some of the components described may be removed and/or modified without departing from a scope of the authenticity determining system 150.

Generally speaking, the authenticity determining system 150 may be implemented to determine whether a package 102, which may include the package 102 or another package that is similar to but not the package 102, is authentic based upon the noise level determined from the package 102. In this regard, the authenticity determining system 150 may include a destination reading module 152 configured to transmit a package image 154 of the package 102 to the authentication module 128 depicted in FIG. 1B. The destination reading module 152 may form part of the user system 230 shown in FIG. 2. In addition, the authentication module 128 may be stored as part of the server system 220.

To authenticate the package 102, the destination reading module 152 may be employed to read a package 102. More particularly, the destination reading module 152 may include a suitable reading device (not shown), such as a scanner, a camera, etc. to image or otherwise scan the package 102, to obtain a package image 154. The destination reading module 152 may optionally include a suitable reading device, such as a RFID reader, a barcode scanner, etc., configured to read the package identifier 110 from the package 102.

The package image 154 may be forwarded to the authentication module 128. In addition, or alternatively, the destination reading module 152 may be configured to determine a signal created by the package image 154, and may forward the package image 154 signal to the authentication module 128. In either respect, the authentication module 128 may determine whether a noise level is associated with the package image 154 or the signal created from the package image 154.

By way of example, the authentication module 128 may compare a signal corresponding to the package image 154 with a signal corresponding to a normal package. A normal package may be considered, for instance, as a package that does not include an identifying characteristic as defined herein. The authentication module 128 may employ the package identifier 110 to determine which package constitutes a normal package. As such, the destination reading module 152 may also transmit the package identifier 110 to the authentication module 128.

If the signals corresponding to the package image 154 and the normal package are nearly identical, the authentication module 128 may output an indication that package 102 lacks the identifying characteristic and that the package 102 may not be authentic. In this instance, the noise level of the package image 154 may be considered as being nonexistent because the difference between the signals corresponding to the package image 154 and the normal package is relatively nonexistent. The authentication module 128 may transmit an indication, such as discrete electrical signals or a message like e-mails or facsimiles, to a destination output 156, such as, a user computer running web or non-web services, or other type of devices like user interfaces, that the package 102 may be inauthentic. Signals corresponding to the package image 154 and the normal package are nearly identical or substantially matching, for example, if there similarities are greater than a predetermined threshold. For example, if the signals are 99% similar and the deviations are known to cause at least a 10% difference in the signals, then the signals are considered nearly identical or substantially matching. It will be apparent that the threshold may vary based on the implementation of the embodiment and other factors, such as the accuracy of the image creation, the amount of noise typically introduced, etc.

If the signals corresponding to the package image 154 and the normal package are not nearly identical, the differences between the signals may be determined to develop a noise level of the package 102. In addition, the authentication module 128 may compare the noise level of the package 102 with noise levels stored in the database 130. The database 130 may be populated with one or more noise levels as described above with respect to FIG. 1B. Again, the authentication module 128 may employ the package identifier 110 to determine which of the noise levels the package image 154 signal is to be compared, if, for instance, the database 130 contains a plurality of noise levels associated with different products.

In any regard, if the noise level of the package image 154 does not match an appropriate noise level stored in the database 130, the authentication module 128 may output an indication to the destination output 156 that the package 102 may not be authentic. If, however, the noise level of the package image 154 does match an appropriate noise level stored in the database 130, the authentication module 128 may output an indication to the destination output 156 that the package 102 may be authentic.

Communications from the authentication module 128 and the destination output 156 may be performed through facsimile, email, web pages viewable in a web browser, etc. In addition, the authentication module 128 may store date and time information regarding the inquiry as to whether the package 102 is authentic, as well as whether the package 102 was found to be authentic. This information may be stored in the database 130 and may be used, for instance, for tracking purposes.

Figure 2:
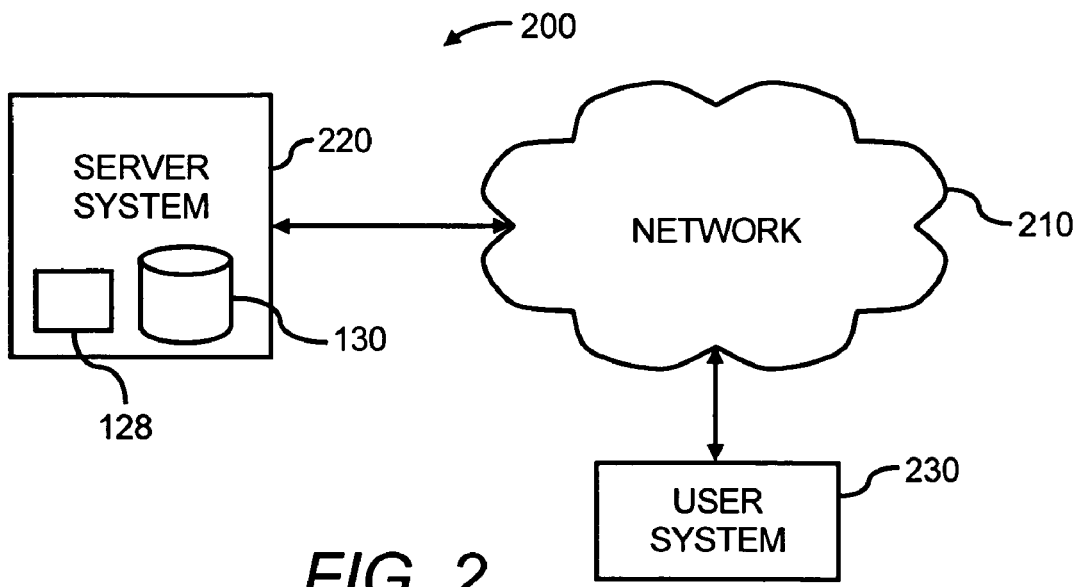
FIG. 2 illustrates a simplified example of an authentication system, according to an embodiment of the invention.

FIG. 2 illustrates a simplified example of a system 200 through which the authenticity of a package 102 may be determined. The system 200 includes a network 210, a server system 220 and a user system 230. The server system 220 and the user system 230 may include any reasonably suitable type of computer system, such as the computer system described herein below with reference to FIG. 6. The server system 220 may include a network interface including software and/or hardware, and serving software (not shown) for communicating with other systems connected to the server system 220 through the network 210. The network 210 may include any type of network, including a LAN, a WAN, the Internet, etc.

The server system 220 may include the authentication module 128 and the database 130. The user system 230 may include, for instance, the destination reading module 152 and the destination output 156. As such, the user system 230 may be used to submit the package image 154 to the server system 220 through a website administered by the server system 220.

The server system 220 may implement the authentication module 128 to compare a noise level of the received package image 154 to the origin noise level 134 stored in the database 130. In addition, the server system 220 may transmit a message to the user system 230 indicating that the package 102 is authentic or that the package 102 may not be authentic via the network 210. The message transmitted by the server system 220 may include a message sent to a browser of the user system 230, an email or other type of message, including facsimiles, etc.

Figure 3:
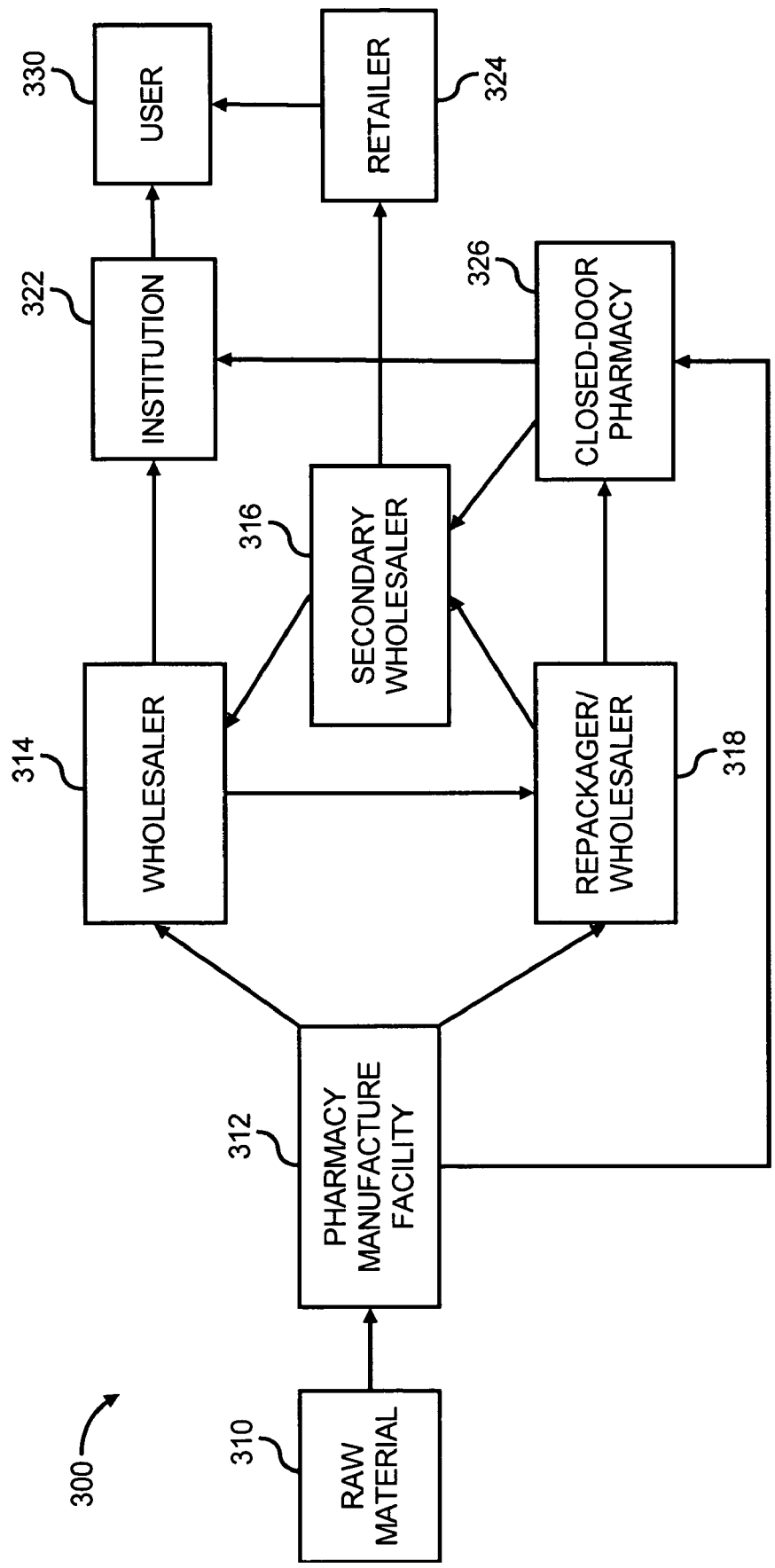
FIG. 3 illustrates a simplified example of a supply chain in which the authentication system described herein may be used, according to an embodiment of the invention.

The system 200 may be used to authenticate any reasonably suitable type of product at any point of a supply chain, from the manufacturer to the customer. As an example, FIG. 3 illustrates a pharmaceutical supply chain and use of the authentication system 200 in FIG. 2 in a pharmaceutical supply chain. It should be apparent that the authentication system 200 may be used in supply chains for many product types without departing from a scope of the authentication system 200.

FIG. 3 illustrates a simplified example of a supply chain 300 for the sale of pharmaceutical ("pharma") products. As shown in FIG. 3, raw materials 310 are received by a pharma manufacturing facility ("PMF") 312. The PMF 312 sends the manufactured pharma products to a wholesaler 314 or a repackager/wholesaler 318. The wholesaler 314 may sell the pharma products to institutions 322, such as pharmacies, hospitals, nursing homes or hospices, or retailers 324, which sell the pharma products to individual users 330. The wholesaler 314 may also send some or all of its received pharma products to the repackager/wholesaler 318.

The repackager/wholesaler 318 may sell the pharma products to closed-door pharmacies 326. The closed door pharmacies 326 may sell the pharma products to institutions 322, such as hospitals, nursing homes or hospices. The PMF 312 may also directly provide pharma products to the closed-door pharmacies 326.

Problems with counterfeit goods may arise with a network of secondary wholesalers 316. Some of the pharma products received by the repackager/wholesalers 318 or closed-door pharmacies 326 may end up at the secondary wholesalers 316, who may sell the pharma products at highly discounted prices to retailers 324, such as pharmacies, or wholesalers 314.

Due to the number of entities handling the pharma products as they progress through the supply chain 300, pharmacies 324 and institutions 322 may receive counterfeit pharma products. For example, secondary wholesalers 316 may receive counterfeit products, which the secondary wholesalers 316 may sell to retailers 324 or wholesalers 314, introducing the counterfeit products into the supply chain 300. Counterfeit pharma products may include, for instance, pharma products that have been re-imported into the country from abroad, pharma products that have expired (but the expiry dates have been changed on the packaging), or pharma products not manufactured by the PMF 312 that are packaged in packaging designed to spoof the packaging of the real pharma products.

The authentication system 200 in FIG. 2 may be used in the supply chain 300 to authenticate pharma products produced by the PMF 312. The server system 220 used to authenticate the pharma products may be administered by the PMF 312 or administered by an agent of the PMF 312. The user system 230 may be located at any of the other locations in the supply chain 300, including the institution 322, the retailers 324, closed-door pharmacies 326, the wholesaler(s) 314, repackager/wholesaler(s) 318, secondary wholesaler(s) 316, or individual user 330. In addition, the user system 230 may be located at any point outside of the supply chain where authentication is desired.

Figure 4:
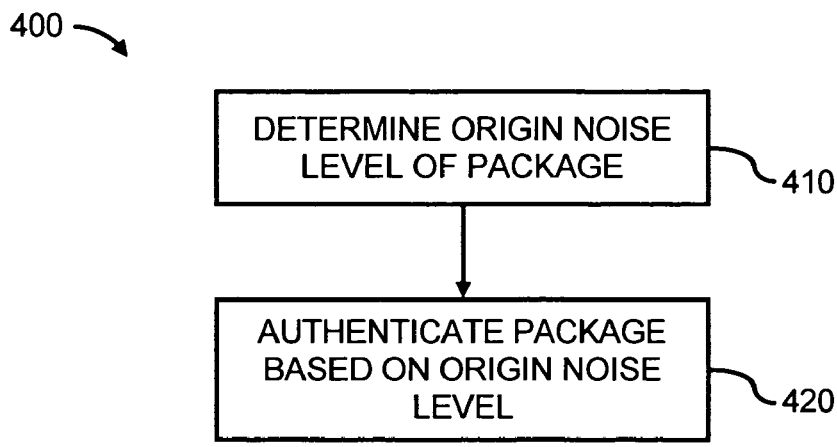
FIGS. 4 and 5A illustrate respective flow diagrams of methods of authenticating at least one package, according to embodiments of the invention.

With reference now to FIG. 4, there is shown a flow diagram of a method 400 of authenticating a package 102. It is to be understood that the following description of the method 400 is but one manner of a variety of different manners in which an example of the invention may be practiced. It should also be apparent to those of ordinary skill in the art that the method 400 represents a generalized illustration and that other steps may be added or existing steps may be removed, modified or rearranged without departing from a scope of the method 400.

The description of the method 400 is made with reference to FIGS. 1A-1C, and thus makes reference to the elements cited therein. It should, however, be understood that the method 400 shown in FIG. 4 is not limited to being implemented by the elements shown in FIGS. 1A-1C and may be implemented by more, less, or different elements as those shown in FIGS. 1A-1C.

At step 410, an origin noise level 134 of a package 102 is determined. The origin noise level 134 of the package 102 may be determined based on one or more identifying characteristics introduced into the package 102, as described herein above. In addition, the origin noise level 134 may be determined through use of the origin reading module 124 and the origin noise analysis module 126, as also discussed above with respect to FIG. 1B.

At step 420, a package 102, which may comprise a package similar to but not the package 102, is authenticated based on the stored origin noise level 134. As described in detail herein above, the package 102 may be authenticated through a comparison of the noise levels in the package image 154 and a stored origin noise level 134.

Figure 5A:
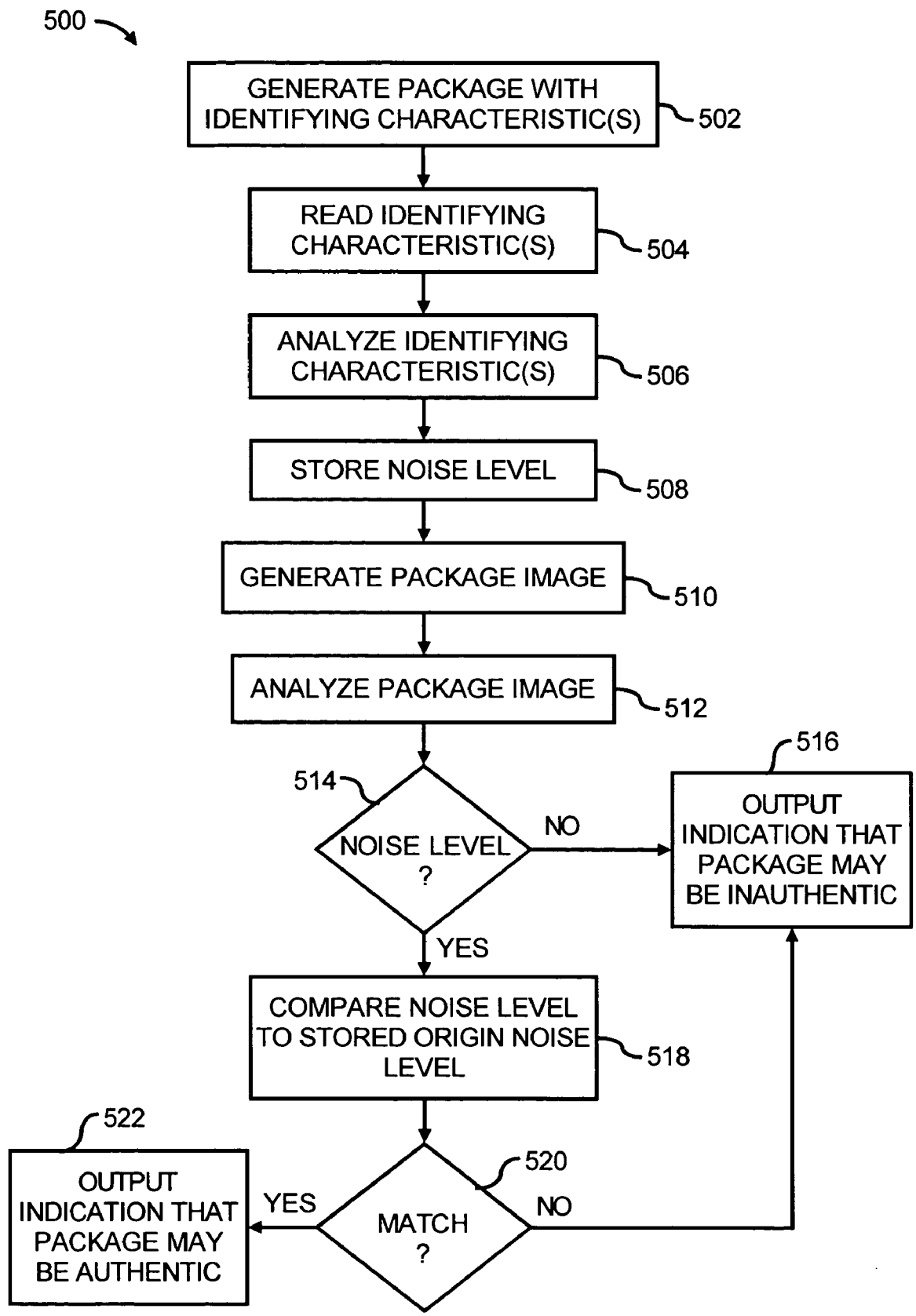

A more detailed description of the steps outlined in the method 400 is provided with respect to the method 500 depicted in FIG. 5A. As such, FIG. 5A depicts a flow diagram of a method 500 of authenticating the package 102.

As indicated at step 502, the package 102 may be generated with the one or more identifying characteristics. In other words, at step 502, an origin noise level 134 for a package 102 may be determined. A more detailed description of a manner in which the origin noise level 134 for a package 102 may be determined at step 502 is described with respect to the method 550 depicted in FIG. 5B.

At step 552, one or more identifying characteristics may intentionally be introduced onto the package 102. The one or more identifying characteristics may include indicia 104 placed either directly or indirectly onto package 102. Thus, at step 552, the indicia 104 may be printed on the package 102, or the indicia 104 may be printed on a label affixed to the package 102, using custom printing techniques. For instance, the one or more identifying characteristics may be printed using variable data printing, where printing may be varied for individual packages 102.

In addition, or alternatively, the one or more identifying characteristics may include a structural feature 108. As such, at step 552, the package 102 may be manufactured to include the structural feature 108.

At step 554, the package 102, including the one or more identifying characteristics, may be read through use of any reasonably suitable reading device to obtain a package image 132 (FIG. 1B). The suitability of the reading device may be based upon the types of one or more identifying characteristics introduced onto the package 102. In any regard, at step 556, an origin noise level 134 (FIG. 1B) may be determined through an analysis of the package image 132.

At step 558, the origin noise level 134 may be stored in a database 130 (FIG. 1B). The origin noise level 134 may optionally be stored with an associated package identifier 110 of the package 102.

With reference back to FIG. 5A, at step 504, the one or more identifying characteristics may be read by the origin reading module 124, to thereby create a package image 132. The package image 132 may be analyzed by the origin noise analysis module 126, as indicated at step 506. In this regard, the package image 132, and more particularly, the one or more identifying characteristics, may be analyzed to determine the noise level associated with the package 102. The noise level of the package 102 may be determined through a comparison of a signal level of the package 102 and the signal level of a normal package. In addition, the noise level of the package 102 may be stored, as indicated at step 508.

At step 510, a package image 154 of a package to be authenticated, which may include the package 102, is generated by the destination reading module 152. In addition, the package image 154 may be analyzed by the authentication module 128, as indicated at step 512.

The authentication module 128 may determine whether a noise level is associated with the package image 154 at step 514. More particularly, for instance, the authentication module 128 may determine whether the package image 154 includes one or more of the identifying characteristics described above by, for instance, comparing the signal level of the package image 154 with the signal level of a normal package. If the authentication module 128 determines that the package image 154 does not include a noise level at step 514, the authentication module 128 may output an indication that the package 102 may be inauthentic, at step 516.

In addition, if, at step 514, the package 102 is determined to include a noise level, the authentication module 128 may compare the noise level of the package 102 to the stored origin noise level of the package 102, as indicated at step 518. If, at step 520, the authentication module 128 determines that the noise level of the package 102 does not match the origin noise level of the package 102, the authentication module 128 may output an indication that the package 102 may be inauthentic, as indicated at step 516.

If, on the other hand, the noise level of the package 102 is found to substantially match the origin noise level of the package 102, the authentication module 128 may output an indication that the package 102 may be authentic, as indicated at step 522. A substantial match may be based on a threshold in one example. Signals corresponding to the package image 154 and the normal package are nearly identical or substantially matching, for example, if there similarities are greater than a predetermined threshold. By way of example and not of limitation, if the noise level of the package 102 and the origin noise level are 99% similar, then the noise levels substantially match. It will be apparent that the threshold may vary based on the implementation of the embodiment and other factors, such as the accuracy of the determination of the noise levels, the amount of noise typically introduced, etc.

The outputs from the authentication module 128 may be transmitted to the destination output 156 of the user system 230, as described above.

Figure 6:
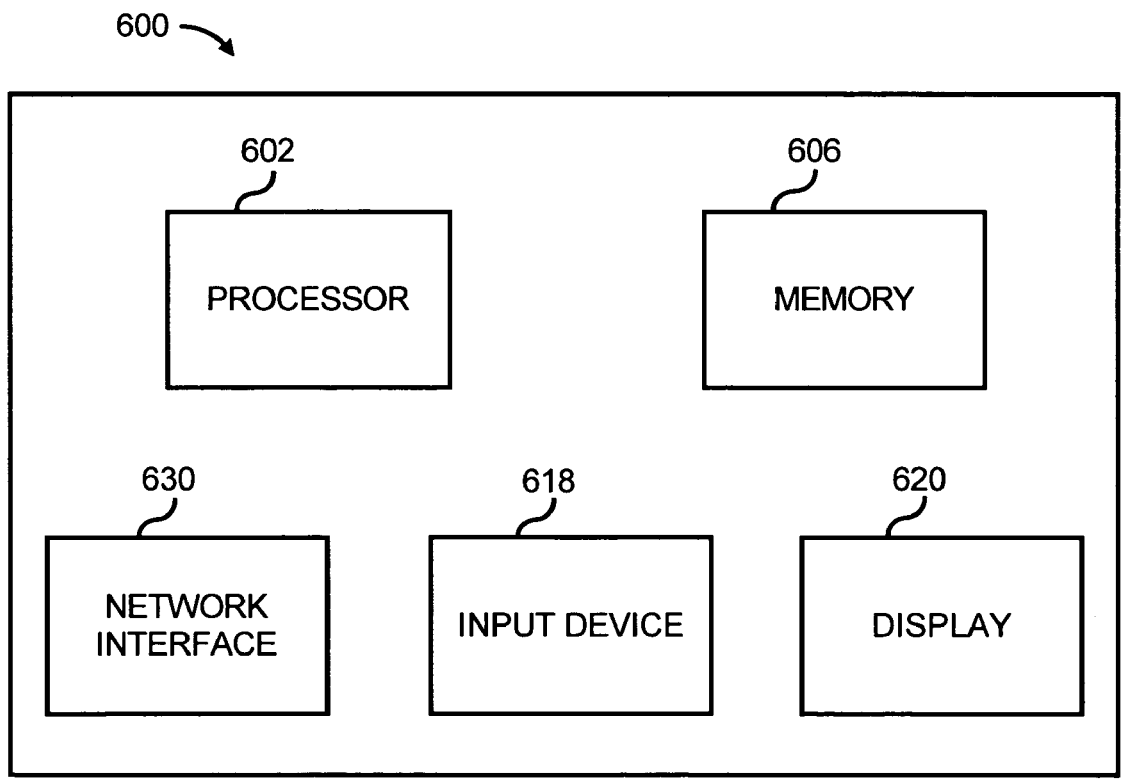
FIG. 6 is a block diagram illustrating a computer system operable to perform some or all of the steps contained in the methods depicted in FIGS. 4, 5A and 5B, according to an embodiment of the invention.

Referring to FIG. 6, and also with reference to FIG. 2, a schematic diagram of a computer system 600 is shown in accordance with an embodiment. The computer system 600 shown may be used as a server 220 in the system shown in FIG. 2. The computer system 600 may include one or more processors, such as processor 602, providing an execution platform for executing software. The computer system 600 also includes a memory 606, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 600 with one or more input devices 618, such as a keyboard, a mouse, a stylus, and the like and a display 620. A network interface 630 is provided for communicating with other computer systems. It will be apparent to one of ordinary skill in the art that FIG. 6 is meant to illustrate a generic computer system. Any type of computer system may be used. Furthermore, one or more components of the components of the computer system 600 are optional, such as the display and input devices, and other types of components may be used or substituted as is known in the art.

Figure 5B:
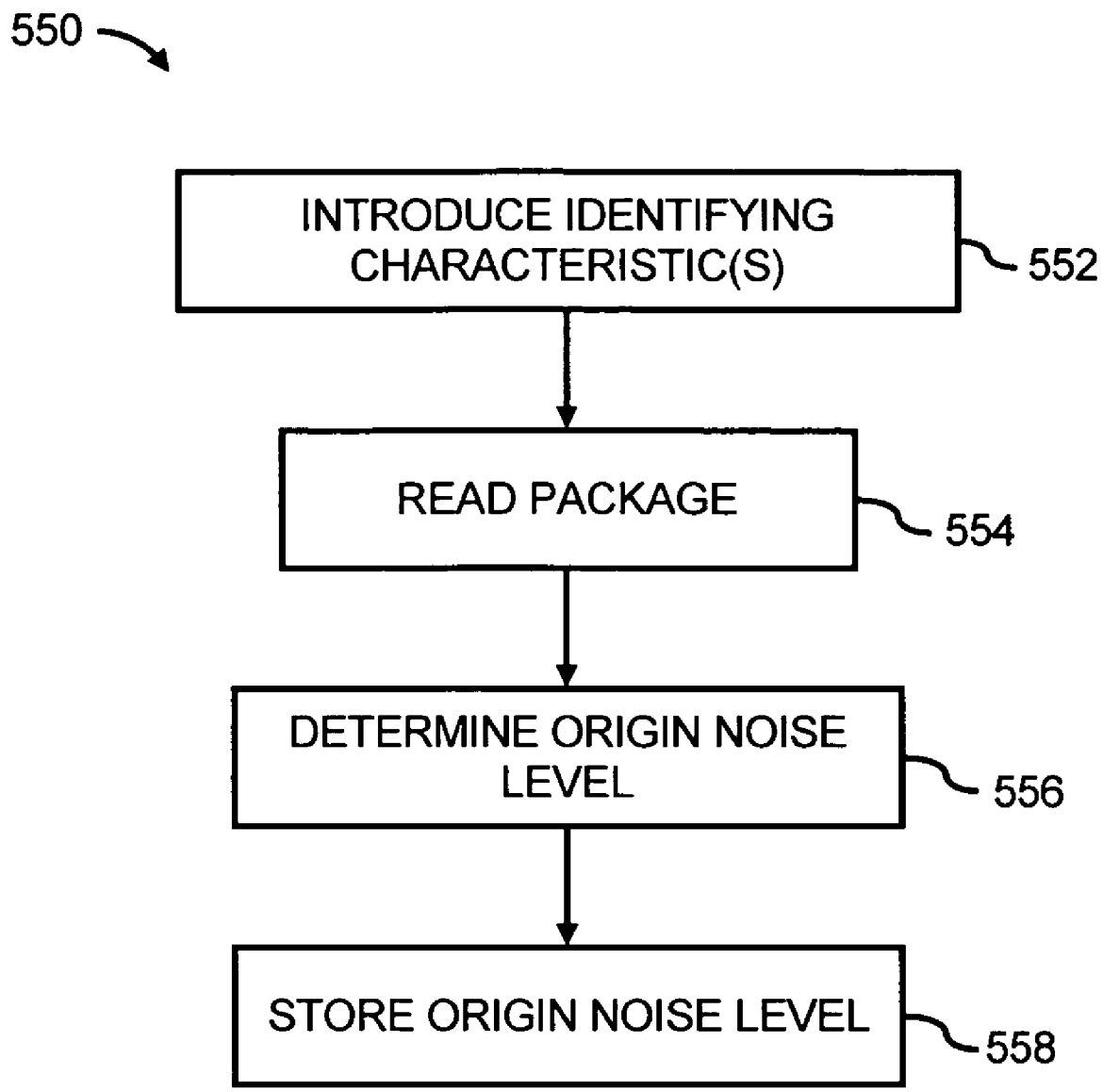
FIG. 5B illustrates a flow diagram of a method of generating a package according to an embodiment of the invention.

One or more of the steps of the operations shown in FIGS. 4, 5A, and 5B may be implemented as software embedded on a computer readable medium, such as the memory 606, and executed by the processor 602. The steps may be embodied by a computer program, which may exist in a variety of forms both active and inactive. For example, there may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of authenticating a package to be authenticated, the method comprising:

obtaining a first optical reading of an original package;

measuring a normal signal level of the original package from the first optical reading;

introducing one or more identifying characteristics onto the original package;

obtaining a second optical reading of the original package and the one or more identifying characteristics;

measuring a modified signal level of the original package from the second optical reading;

determining a difference between the modified signal level and the normal signal level;

determining an origin noise level of the original package, wherein the origin noise level comprises the difference between the modified signal level and the normal signal level;

determining a noise level of a package to be authenticated;

comparing the noise level of the package to be authenticated with the origin noise level; and indicating that the a package to be authenticated is authentic in response to the noise level of the package to be authenticated substantially equaling the origin noise level.

2. The method according to claim 1, wherein the step of determining a noise level of the package to be authenticated further comprises generating a package image of the package to be authenticated, determining a signal level of the package image and a signal level of the original package and comparing the signal level or the package image with the signal level of the original package to determine the noise level of the package to be authenticated, wherein the noise level of the package to be authenticated comprises a difference between the signal level of the package image and the signal level of the original package.

3. The method according to claim 2, further comprising:

outputting an indication that the package to be authenticated is inauthentic in response to a determination that a noise level is not associated with the package to be authenticated.

4. The method according to claim 1, wherein the original package includes a package identifier, said method further comprising:

reading the package identifier of the original package; and wherein the step of authenticating further comprises employing the package identifier to substantially distinguish the original package from other packages in authenticating the package to be authenticated.

5. A method of determining an origin noise level for an original package, said method comprising:

optically reading the original package to obtain a normal signal level;

introducing one or more identifying characteristics onto the original package;

optically reading the original package with the one or more identifying characteristics to obtain a modified signal level;

determining a difference between the modified signal level and the normal signal level;

determining an origin noise level of the original package, wherein the origin noise level comprises the difference between the modified signal level and the normal signal level; and storing the origin noise level.

6. The method according to claim 5, wherein the one or more identifying characteristics comprises indicia, and wherein introducing the one or more identifying characteristics comprises introducing the indicia onto the original package.

7. The method according to claim 6, wherein introducing the indicia onto the original package further comprises printing the indicia using variable data printing, wherein the indicia is varied for at least one package other than the original package.

8. The method according to claim 5, wherein the one or more identifying characteristics comprises a structural feature of the original package, and wherein introducing the one or more identifying characteristics further comprises introducing the structural feature onto the original package.

9. The method according to claim 5, wherein introducing the one or more identifying characteristics further comprises intentionally introducing the one or more identifying characteristics onto the original package to distinguish the original Package from counterfeit packages.

10. A system for authenticating a package to be authenticated, said system comprising:

an origin reading module configured to obtain a first optical reading of an original package without one or more identifying characteristics and to obtain a second optical reading of the original package with the one or more identifying characteristics, wherein the one or more identifying characteristics distinguish the original package from a normal package, and wherein the original package and the normal package appear identical except for the one or more identifying characteristics of the original package;

an origin noise analysis module configured to determine an origin noise level associated with the original package based upon a difference between a signal level of the first optical reading and a signal level of the second optical reading; and an authentication module configured to authenticate the package to be authenticated based upon a comparison of noise level of the original package and a noise level of the package to be authenticated.

11. The system according to claim 10, further comprising:

a destination reading module configured to obtain a package image of the package to be authenticated; and wherein the authentication module is further configured to determine a noise level associated with the package to be authenticated from the package image of the package to be authenticated and the first optical reading of the original package, and wherein the authentication module is further configured to authenticate the package to be authenticated through a comparison of the noise level associated with the package to be authenticated and the origin noise level.

12. The system according to claim 11, wherein the destination reading module and the authentication module are separated from each other and are in communication through a network.

13. The system according to claim 12, wherein the authentication module is configured to communicate an indication of whether the package to be authenticated is authentic over the network to a destination output.

14. The system according to claim 10, wherein the package to be authenticated includes a package identifier, the system further comprising:

a database storing a plurality of origin noise levels associated with a plurality of original packages, wherein the plurality of original packages are also associated with respective package identifiers; and wherein the authentication module is configured to select one of the plurality of origin noise levels in authenticating the package to be authenticated based upon a comparison of the package identifier of the package to be authenticated and the package identifiers of the plurality of original packages.

15. The system according to claim 10, wherein the one or more identifying characteristics comprise at least one of an indicia placed on the original package and a structural feature of the original package.

16. A system for authenticating a package to be authenticated, said system comprising:
- means for obtaining a first optical reading of an original package;
- means for measuring a normal signal level of the original package from the first optical reading;
- means for introducing one or more identifying characteristics onto the original package;
- means for obtaining a second optical reading of the original package with the one or more identifying characteristics;
- means for measuring a modified signal level of the original package from the second optical reading;
- means for determining a difference between the modified signal level and the normal signal level;
- means for determining an origin noise level of the original package, wherein the origin noise level comprises the difference between the modified signal level and the normal signal level;
- means for determining a noise level of the package to be authenticated; and
- means for authenticating the package to be authenticated based upon a comparison of the noise level of the package to be authenticated and the origin noise level.

17. A computer program product embodied on a computer-readable medium and comprising code that, when executed, causes a computer to perform the following:
- obtain a first optical reading of an original package;
- measure a normal signal level of the original package from the first optical reading;
- introduce one or more identifying characteristics onto the original package;
- obtain a second optical reading of the original package and the one or more identifying characteristics;
- measure a modified signal level of the original package from the second optical reading;
- determine a difference between the modified signal level and the normal signal level;
- determine an origin noise level of the original package, wherein the origin noise level comprises the difference between the modified signal level and the normal signal level;
- determine a noise level of a package to be authenticated; and
- authenticate the package to be authenticated based upon a comparison of the noise level of the package to be authenticated and the origin noise level.

* * * * *

UNITED STATES PATENT AND TRADEMARK OFFICE
CERTIFICATE OF CORRECTION

| | | |
|---|---|---|
| PATENT NO. | : 7,730,797 B1 | Page 1 of 1 |
| APPLICATION NO. | : 11/264065 | |
| DATED | : June 8, 2010 | |
| INVENTOR(S) | : Vinay Deolalikar et al. | |

It is certified that error appears in the above-identified patent and that said Letters Patent is hereby corrected as shown below:

In column 11, line 18, in Claim 1, after "the" delete "a".

In column 11, line 27, in Claim 2, delete "or" and insert -- of --, therefor.

In column 12, line 15, in Claim 9, delete "Package" and insert -- package --, therefor.

In column 12, line 35, in Claim 10, before "noise" insert -- the --.

Signed and Sealed this
Fifteenth Day of November, 2011

David J. Kappos
*Director of the United States Patent and Trademark Office*